Nov. 8, 1938.   A. HOLTMEIER   2,135,640
LATHE WITH HORIZONTAL FACEPLATE
Filed Oct. 26, 1937   2 Sheets-Sheet 2
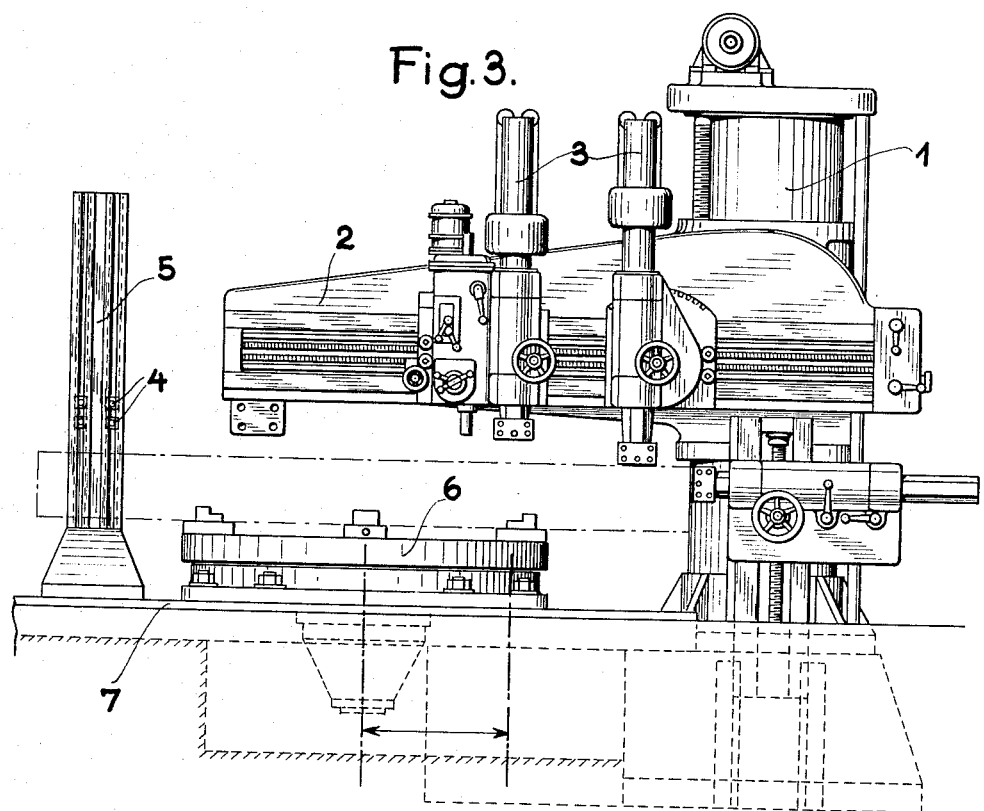
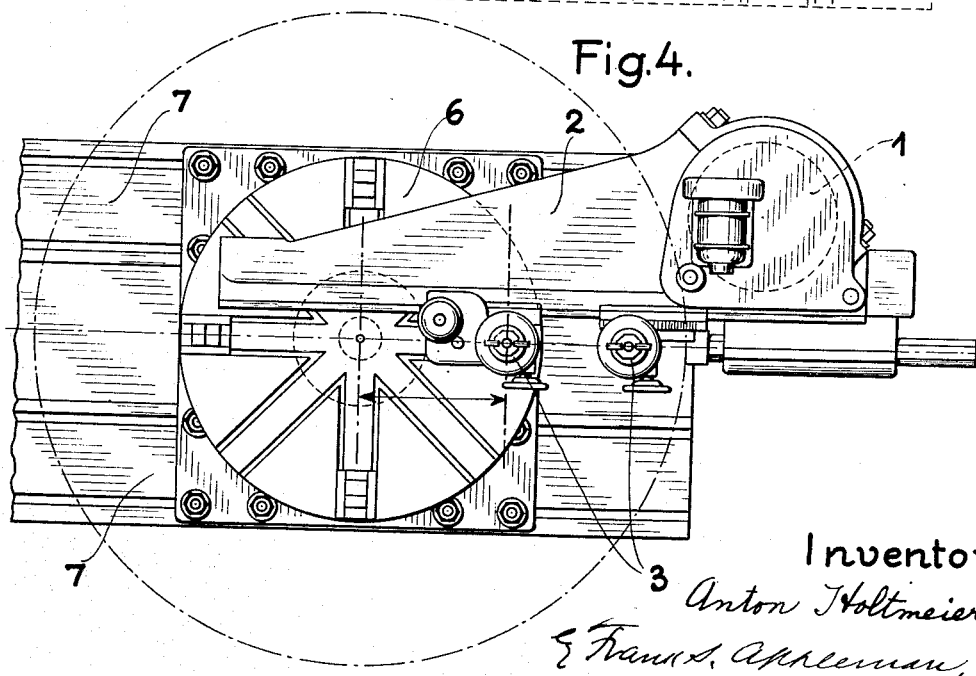
Inventor,
Anton Holtmeier, Patented Nov. 8, 1938

2,135,640

UNITED STATES PATENT OFFICE 2,135,640

LATHE WITH HORIZONTAL FACEPLATE

Anton Holtmeier, Dusseldorf-Hilden, Germany

Application October 26, 1937, Serial No. 171,140
In Germany September 5, 1936

2 Claims. (Cl. 29—29)

This invention has for an object to provide an improved horizontal face plate lathe with two columns. With previous horizontal face plate lathes having two columns the machining of a work piece which was larger than the distance between the two columns carrying the traverse upon which the slide rests, could not take place. In the few cases where a comparatively large work piece had to be machined it was then necessary to increase the number of machines by providing a horizontal face plate lathe, the columns of which were at a great distance from each other, to take care of such over-size jobs. This is not only expensive but above all not economical as the machining of such large work pieces is comparatively rare. Such an expensive lathe taking up so much room can consequently not be utilized to a sufficient extent to warrant the expense thereof.

It is an object of the present invention to obviate these drawbacks and contrive a horizontal face plate lathe with two columns, which is economical in use. These objects are attained by providing a lathe in which one column is adapted to be separated from the traverse and shifted in the longitudinal direction or in which one column is removably arranged on the machine bed, the work piece table being also movable in the longitudinal direction of the traverse. The removable column can be made lighter than the stationary one which is permanently connected with the traverse and which may consist of a hollow cylinder provided with reinforcements, whereby the production is simplified.

The invention is shown in an embodiment by way of example in the accompanying drawings.

Fig. 3 is an elevation showing one of the columns being shifted out laterally.

Fig. 4 is a plan of Fig. 3.

Figure 1:
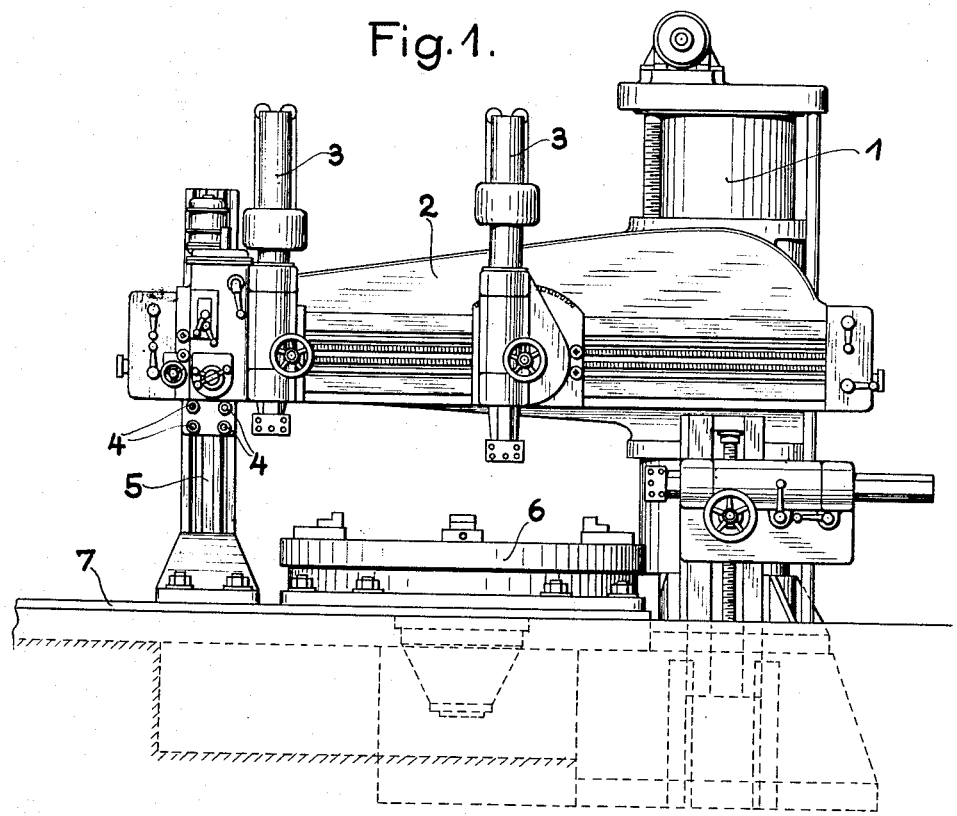
Fig. 1 is an elevation of a horizontal face plate lathe with two columns.
Figure 2:
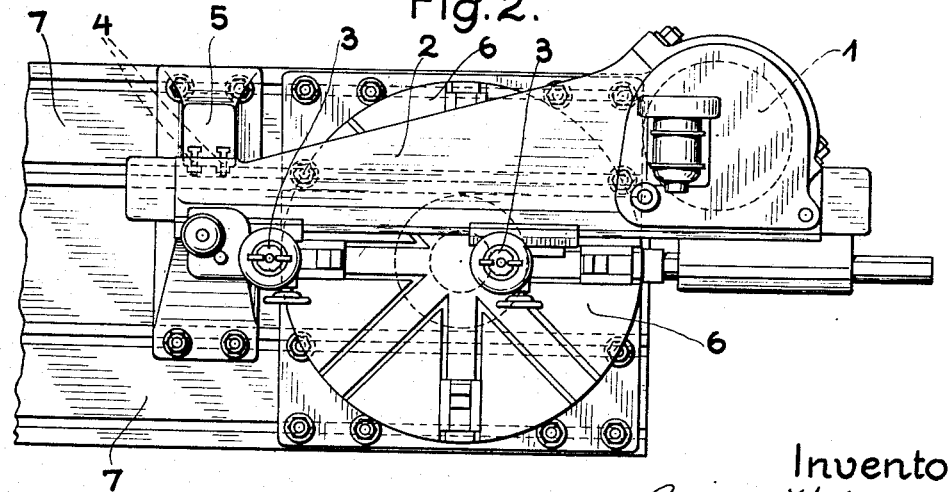
Fig. 2 is a plan of Fig. 1.

A traverse 2 is mounted on the column 1 and is vertically displaceable thereon. The traverse 2 is adapted to be fixed in an adjusted position on the main column 1 which consists of a hollow cylinder provided with reinforcements. The traverse 2 carries the slide rests 3 which are horizontally displaceable thereon and which are adapted to be fixed in adjusted positions. The traverse 2 is attached by its other end by means of bolts 4 to a second column 5 upon which the traverse is adapted to be shifted vertically and fixed. Below the traverse is movably carried in the machine bed 7 the driven rotary table 6 which supports the work piece which is shown in broken line in Fig. 3. As shown by Fig. 3, the column 5 after the bolts 4 are loosened can be shifted outwardly on the bed 7 in the longitudinal direction of the traverse. The table 6 also can be shifted by a corresponding amount so that a larger piece of work can be clamped thereon for machining. The auxiliary column 5 is of lighter construction than the column 1 and does not function at all when moved beyond the outer end of the traverse 2. However, the traverse is then adequately supported by the column 1 which is made sufficiently strong to support the traverse by itself.

Having now particularly described and ascertained the nature of my said invention and in what manner the same is to be performed, I declare that what I claim is:

1. A horizontal face plate lathe, comprising a bed, a column rigidly attached to said bed, a traverse supported at one end by said column, an auxiliary column normally supporting the other end of said traverse, said auxiliary column being removably attached to said bed, and a rotary work supporting table, said table being movably attached to said bed for movement towards and away from said first column beneath said traverse.

2. A horizontal face plate lathe, comprising a bed, a column rigidly attached to said bed, a traverse supported at one end by said column, an auxiliary column normally supporting the other end of said traverse, said auxiliary column being removably attached to said bed, and a rotary work supporting table, said table being movably attached to said bed for movement towards and away from said first column beneath said traverse, said auxiliary column being relatively small to facilitate the removal thereof and said first named column being relatively large to permit it to support said traverse upon the removal of said auxiliary column.

ANTON HOLTMEIER.